United States Patent
Liu et al.

(10) Patent No.: US 7,411,908 B2
(45) Date of Patent: Aug. 12, 2008

(54) METHOD AND SYSTEM FOR NETWORK EMULATION USING BANDWIDTH EMULATION TECHNIQUES

(75) Inventors: Yunxin Liu, Beijing (CN); Zheng Ni, Beijing (CN); Jian Wang, Beijing (CN); Qian Zhang, Beijing (CN); Wenwu Zhu, Basking Ridge, NJ (US)

(73) Assignee: Microsoft Corporation, Redmond, WA (US)

( * ) Notice: Subject to any disclaimer, the term of this patent is extended or adjusted under 35 U.S.C. 154(b) by 617 days.

(21) Appl. No.: 10/955,812

(22) Filed: Sep. 30, 2004

(65) Prior Publication Data

US 2006/0067351 A1 Mar. 30, 2006

(51) Int. Cl.
*G01R 31/08* (2006.01)
(52) U.S. Cl. ............................. 370/232; 370/412
(58) Field of Classification Search ................ None
See application file for complete search history.

(56) References Cited

U.S. PATENT DOCUMENTS

| | | | | |
|---|---|---|---|---|
| 5,636,371 | A | 6/1997 | Yu | 395/500 |
| 6,674,726 | B1 | 1/2004 | Kado et al. | 370/253 |
| 6,785,241 | B1 | 8/2004 | Lu et al. | 370/241 |
| 6,865,185 | B1 * | 3/2005 | Patel et al. | 370/412 |
| 6,961,941 | B1 * | 11/2005 | Nelson et al. | 719/319 |
| 7,142,513 | B2 * | 11/2006 | Sun et al. | 370/232 |
| 2004/0120319 | A1 | 6/2004 | Asawa et al. | 370/395.4 |
| 2005/0007958 | A1 | 1/2005 | Auerbach | 370/241 |
| 2006/0067351 | A1 | 3/2006 | Liu et al. | 370/429 |
| 2006/0069544 | A1 | 3/2006 | Liu et al. | 709/27 |
| 2007/0165528 | A1 | 7/2007 | Brown et al. | 370/235 |

OTHER PUBLICATIONS

Mogul et al., "The Packet Filter: An Efficient Mechanism for User-Level Network Code", ACM Operating Systems Review, SIGOPS, Nov. 1987, pp. 1-26.
Fall, "Network Emulation in the VINT/NS Simulator", Proceedings of the fourth IEEE Symposium on Computers and Communications, Jul. 1999, pp. 1-7.
Zheng et al., "EMPOWER: a Cluster Architecture Supporting Network Emulation", IEEE Transactions on Parallel and Distributed Systems, Jul. 2004, pp. 617-629.

* cited by examiner

*Primary Examiner*—Edan Orgad
*Assistant Examiner*—Jung Park
(74) *Attorney, Agent, or Firm*—Merchant & Gould P.C.

(57) ABSTRACT

A method and system for emulating a network bandwidth condition includes maintaining a queue for holding packets that are received, maintaining a virtual time that is updated whenever a packet timer is scheduled, and, for a selected packet waiting in the queue, calculating a timer expiration time based on the virtual time. A bandwidth emulation module is controlled by an emulator link that comprises a virtual network link to which a first computer is connected. One or more computers may be linked to the first computer.

15 Claims, 4 Drawing Sheets

METHOD AND SYSTEM FOR NETWORK EMULATION USING BANDWIDTH EMULATION TECHNIQUES

FIELD OF THE INVENTION

The present invention relates generally to computers and computer networking, and more particularly to systems and methods that incorporate network emulation techniques.

BACKGROUND OF THE INVENTION

Links across interconnected networks vary substantially with respect to such factors as bandwidth, packet latency, and error and loss rates. Before network protocols and distributed applications are deployed in a real network, it is critical that they be thoroughly tested under various realistic network conditions, to ensure correctness and to verify performance characteristics. Testing in an isolated real network is generally impractical. Therefore, testing typically involves simulation and emulation.

Network simulators generally attempt to provide a rich set of protocol modules and configuration tools suitable for conducting customized simulation experiments. However, network simulation suffers from a number of limitations. Simulators rely principally on models of both the physical network infrastructure and networking protocols. Models by definition only approximate the real conditions being tested, and in complex situations it is often impossible to develop accurate models for purposes of simulation. The functionalities provided by simulation modules are merely logical operations; thus, an implementation in a simulator must be modified before it can be deployed within a target network. Network simulators consume significant resources when the network being simulated is sufficiently large, and they do not provide a view of the network end user's experience.

By contrast, network emulators permit applications and protocols to be tested in real time, on real machines, such as locally-linked computers, using real implementations of network protocols. An emulator includes a supplementary means for imposing synthetic delays and faults on the real network traffic. In effect, the emulator comprises a virtual network with respect to the host machine or machines on which the network applications being tested are running. For a network emulator to be useful, however, it is necessary that it include techniques for emulating various network conditions realistically and accurately.

SUMMARY OF THE INVENTION

The present invention is generally directed towards providing a method and system for emulating a network bandwidth condition. In one embodiment of the invention, emulating a network bandwidth condition includes maintaining a queue for holding packets that are received, maintaining a virtual time that is updated whenever a packet timer is scheduled, and, for a selected packet waiting in the queue, calculating a timer expiration time based on the virtual time.

The queue may be in either a blocked or an unblocked state. According to one aspect of the invention, when a packet arrives, if the queue is blocked, the packet is inserted in the queue. If the queue is unblocked, the time cost for transmitting the packet, in accordance with a specified bandwidth configuration, is calculated; the expiration time for a timer for the packet is calculated based on the current time and the transmitting time cost; the timer is scheduled; the queue is set to the blocked state; and the virtual time is updated with the value of the expiration time.

According to another aspect of the invention, when a packet timer expires, the corresponding packet is sent out. If the queue is empty, the queue is set to the unblocked state. If the queue is not empty, for particular packet in the queue (such as the packet at the head of the queue), a time cost for transmitting the queued packet is calculated; the timer expiration time for the packet is calculated based on the virtual time and the transmitting time cost; the timer is scheduled; and the virtual time is updated with the value of the expiration time.

According to another aspect of the invention the queue may be maintained as a FIFO queue having a specified maximum size. Alternatively, the queue may be maintained as a random earlier drop queue having specified minimum and maximum queue size thresholds. If the number of packets in the queue is within the range defined by the thresholds, the congestion status of the queue is determined by computing a probability based on the minimum queue size, the maximum queue size, and the current queue size. The queue may be maintained in accordance with a drop head mode, a drop tail mode, or a drop random mode.

In accordance with another embodiment of the invention, a system for emulating a network bandwidth condition includes a first computer having a network interface; an emulator link for receiving and sending packets, the emulator link comprising a virtual network link to which the first computer is connected; and a bandwidth emulation module controlled by the emulator link. One or more computers may be linked to the first computer by way of a local network.

DETAILED DESCRIPTION OF THE INVENTION

The present invention includes a network emulator that operates on real network traffic between computers, such as IP traffic, to achieve realistic and accurate emulation results, based on user-configured settings. All emulation procedures occur on an emulator link, which comprises a virtual network link. A plurality of emulation algorithms are employed, based on well-formed mathematical models for emulation of various network characteristics and conditions, including bandwidth, queue, packet loss, latency, error propagation, packet out-of-order, and background traffic. The invention is usable for emulation of wired and wireless network scenarios. In one embodiment, the invention provides a software-based network emulator for use in a conventional general-purpose computing system, although embodiments incorporating the invention wholly or partly in hardware or in special-purpose devices are also contemplated.

Additional inventive architectural aspects of the network emulator are described in further detail in the commonly-assigned U.S. patent application, "Network Emulator Architecture," application Ser. No. 10/955,933, filed on Sep. 30, 2004, incorporated herein by reference.

Figure 1:
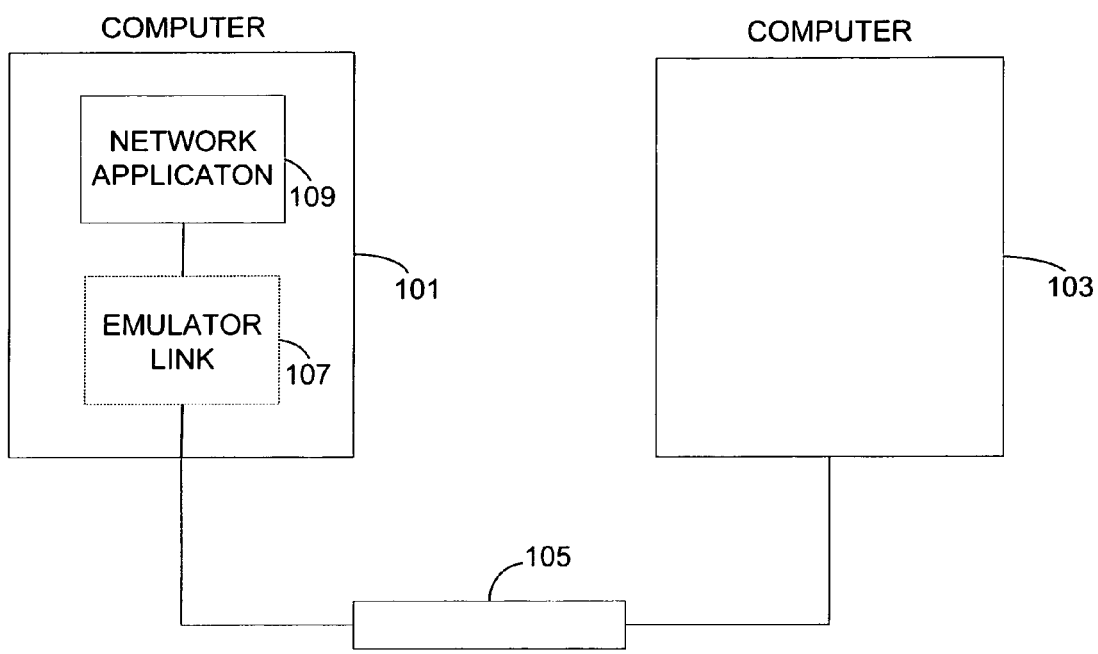
FIG. 1 is a block diagram providing a simplified illustration of one possible environment in which the present invention may be incorporated.

Turning to the drawings, FIG. 1 provides a simple illustration of one possible environment in which the present invention may be incorporated. Two computers 101, 103 are linked by way of a local network connection 105, as for example an Ethernet link. The computers 101, 103 may be computing machines of various sorts, such as personal computers, servers, workstations, portable computers, special-purpose computing devices, and the like, having appropriate network interfaces, as well as, at a minimum, such components as a processor, memory storage, and input and output interfaces. In a representative environment one computer, such as the computer 101, runs a server program, such as a TCP or UDP server, and another machine, such as the computer 103, runs a client program, such as a TCP or UDP client. The features of the various computing devices within which the invention may be incorporated are rudimentary to those having skill in the art and need not be described at length here.

At least one of the computers 101, 103, for example the computer 101, by executing one or more appropriate computer programs in accordance with the invention, establishes an emulator link 107. The emulator link 107 comprises a virtual network link operating upon outgoing or incoming data packets transmitted by or directed towards the computer 101, as by a network application 109 running on the machine 101. Those having skill in the art will appreciate that many other operating environments are possible, including those involving more than two computers generating network traffic, as well as those involving a single computer, and those involving emulation programs executing on more than one computer. Thus the environment depicted in simplified form in FIG. 1 should not be taken as limiting. Moreover, the emulator link may be established by an intermediary device acting as a router or bridge intercepting network traffic between two machines linked thereto.

Emulation Modules

Figure 2:
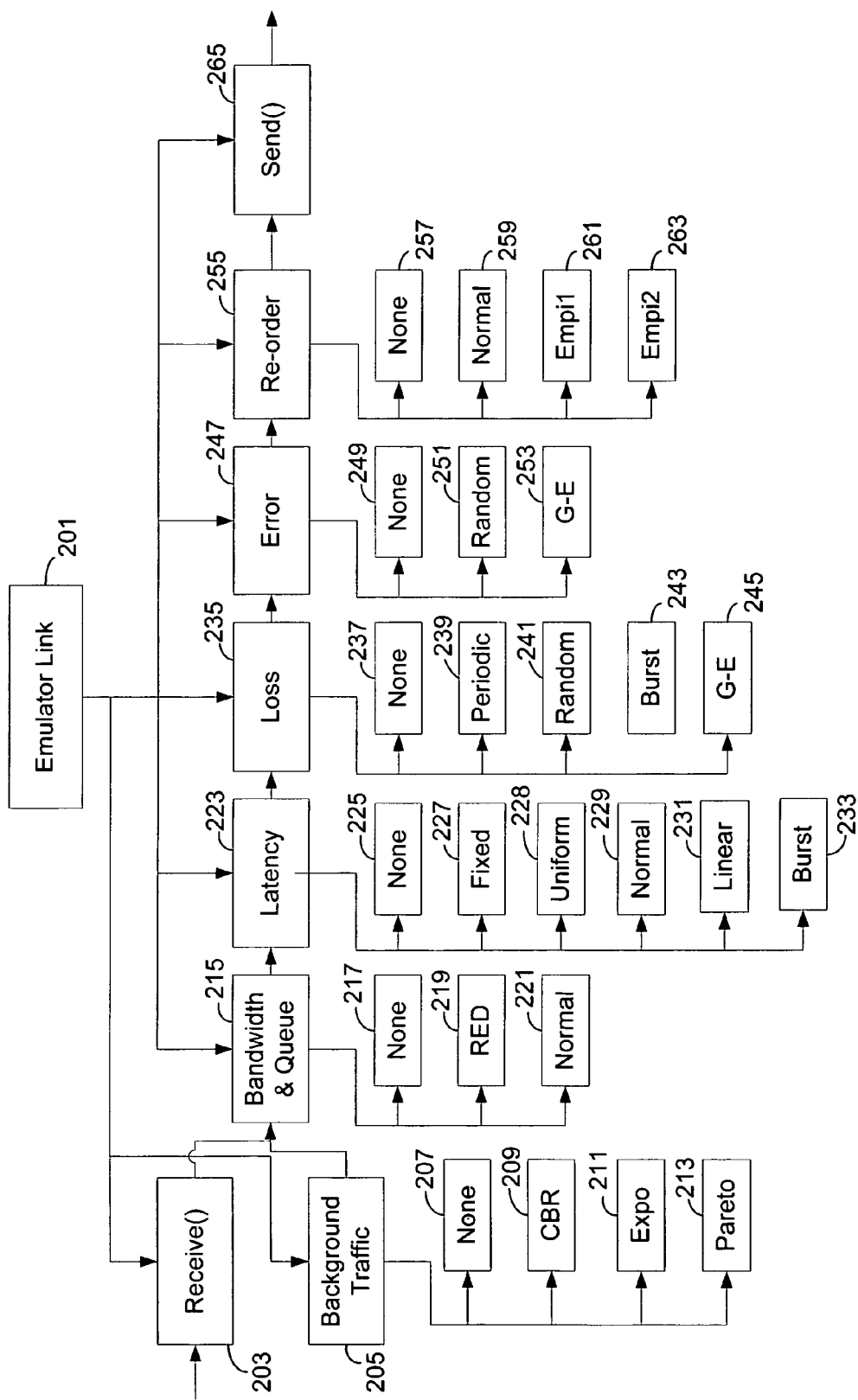
FIG. 2 is a diagram illustrating the structure of a network emulator link in accordance with the invention.

Turning now to FIG. 2, there is shown the conceptual structure of an emulator link 201 in accordance with an embodiment of the invention. The emulator link 201 is in essence a superclass that manages a plurality of emulation modules. Each module operates independently of the others. The emulation modules incorporate particular emulation algorithms and are configurable by a user of the emulator. In one embodiment, as illustrated in FIG. 2, the emulation modules include a background traffic emulation module 205, a bandwidth and queue emulation module 215, a latency emulation module 223, a loss emulation module 235, an error emulation module 247, and a packet reorder emulation module 255. An emulation module has a number of associated types facilitating configuration by the user in order to emulate particular network behaviors. Each module has a type that, if set, disables the module. These types are indicated in FIG. 2 as "None" 207, 217, 225, 237, 249, 257.

A transmitted packet enters the emulator link 201 by calling a "Receive( )" method 203. The packet is successively processed by each emulation module, after which it leaves the link 201 by calling a "Send( )" method 265. If the user does not supply configuration parameters, the emulator link 201 uses default configurations for each module. In an embodiment, the default configuration for each module is equivalent to selection of the disabling type for that module. Thus, for all modules other than the background traffic module 205, the default behavior comprises passing the received packets to the next module, if any, directly without any emulation operation. For the background traffic module 205, the default behavior is not to generate any traffic at all.

The bandwidth and queue module 215 enables emulation of various network bandwidths and queuing behaviors. To emulate different bandwidths, a queue is used. Received packets are placed in the queue and are sent out at a specific rate. Two types of queue are supported: a normal queue type 221 and a Random Earlier Drop (RED) queue type 219. The normal queue 221 places all received packets in a simple FIFO queue with a maximum queue size supplied by the user (e.g., 100 packets). The queue drops a packet when the queue size exceeds the given maximum size. With respect to the RED queue 219, two thresholds are used to determine whether the queue is congested: a minimum threshold and a maximum threshold. If the queue size is larger than the maximum threshold, the queue is congested. If the queue size is smaller than the minimum threshold, the queue is not congested. If the queue size is between the two thresholds, whether the queue is congested depends on a probability which is computed based on the two thresholds and the current queue size. In an embodiment, the probability is computed as (queue_size−min_queue_size)/(max_queue_size−min_queue_size). When a queue is congested, three dropping modes are provided to drop packets from the queue. "Drop head" mode drops packets from the head of the queue. "Drop tail" mode drops packets from the tail of the queue. "Drop random" mode drops packets randomly from the queue. A detailed description of the bandwidth emulation algorithm is provided below.

The latency module 223 enables emulation of the propagation delay behavior of a network link. Several delay pattern types are provided. In fixed latency 227, a packet is held for a fixed length of time, using a value supplied by the user. In uniform latency 228, packets are delayed randomly according to a uniform probability distribution (i.e., every value between a user-supplied minimum delay value and maximum delay value occurs with the same probability). In normal latency 229, packets are delayed randomly according to a normal probability distribution. The user supplies an average delay and a standard deviation. In linear latency 231, a packet is delayed for a time value that linearly increases from a given minimum value to a given maximum value during a given time period. When the delay time value reaches the maximum value, it cycles back to the minimum. In burst latency 233, when a delay occurs, multiple packets may be delayed continuously. The user specifies a delay value of the burst delay state, the range (minimum and maximum) of the burst delay state, and the transition probability from a good state (without any delay) to a bad state (with burst delay). For example, if delay is set to 10 milliseconds, the range is set to between 2 and 10 seconds, and the probability is set to 0.1, there is a probability of 0.1 that the link enters the burst delay state and begins to delay packets, with a fixed delay value of 10 milliseconds. The burst delay state lasts for a random value between 2 seconds and 10 seconds.

The packet loss module 235 enables emulation of packet loss behavior of a network link. Several packet loss pattern types are provided. In periodic loss 239, a packet is discarded periodically (every x packets for a user-supplied value x). In random loss 241, packets are randomly dropped in accordance with a user-supplied loss probability. In burst loss 243, when loss occurs, multiple packets are dropped continuously. The user specifies a packet loss probability and a range indicating the number of packets that should be lost continually (a maximum and minimum burst size). For example, if the probability is 0.1, the maximum is 10 packets and the minimum is 5 packets, the loss module decides whether to lose a packet with a probability of 0.1. If packet loss occurs, m packets are lost continuously, with m a random number between 5 and 10.

In G-E loss 245, packets are dropped according to a Gilbert-Elliot model, in which two states, a good state and a bad state, are used to emulate the packet loss conditions of certain networks. The user specifies the packet loss rates for the good state and the bad state, and the transition probabilities from the good state to the bad state and from the bad state to the good state. The user may also specify a cycle parameter to indicate the time granularity with which to perform the G-E emulation.

The error module 247 enables emulation of the packet error propagation behavior of a network link. This is useful, for example, in emulation of wireless network links in which some bits of certain packets are corrupted during transmission. The error probability can be set using two kinds of units: bit error (the error probability of every bit in the link) and packet error (the error probability of every packet in the link). Two error pattern types are provided. In random error 251, error occurs randomly in packets; packets are corrupted randomly according to a user-supplied rate. For example, the user can set the rate to $10^{-6}$ with an error unit of bit error or to 0.01 with an error unit of packet error. In G-E error 253, packets are corrupted in accordance with a Gilbert-Elliot model. The user specifies the packet error rates for the good state and the bad state and the transition probabilities between the two states. The user may also provide a cycle parameter to indicate the time granularity with which to do G-E emulation.

The packet reorder module 255 enables emulation of packet out-of-order behavior of a network link by adding a latency to a received packet. Three packet out-of-order pattern types are provided: a normal reorder type 259 and two empirically-derived reorder patterns 261, 263. A description of the packet reorder emulation algorithm embodied in the packet reorder module is provided in the commonly assigned U.S. patent application, "Method and System for Network Emulation Using Packet Reorder Emulation Techniques," application Ser. No. 10/955,578, filed Sep. 30, 2004, incorporated herein by reference.

The background traffic module 205 generates virtual packets to emulate background traffic on a network link. Three traffic-generating patterns are provided. In CBR traffic 209, background traffic is generated in accordance with a given constant bit rate. The user supplies the traffic generating rate and the generated packet size. In Expo Traffic 211, background traffic is generated in accordance with an exponential on/off time distribution. The user supplies four configuration parameters: the traffic generating rate, the generated packet size, the burst time, and the idle time. In Pareto Traffic 213, background traffic is generated in accordance with a Pareto on/off time distribution. The user supplies five configuration parameters: the traffic generating rate, the generated packet size, the burst time, the idle time, and a shape parameter.

Bandwidth Emulation Algorithm

The bandwidth and queue 215 module emulates different bandwidths on a network link by queuing the received packets and sending the packets out at a specific rate. This is accomplished by scheduling a timer for each packet so that the packet is sent out in accordance with the rate. The timer resolution is necessarily limited; for example, the limitation may be approximately one millisecond. If each packet has an additional one millisecond delay, the maximum TCP throughput on a 100 Mbps Ethernet link is approximately 10 Mbps. To reduce the influence of timer resolution limitations and achieve higher throughput, the bandwidth emulation algorithm maintains a virtual time to indicate the time at which a packet should be sent out. When a timer is scheduled, its expiration time is calculated based on the virtual time rather than the current time based on the packet sending history.

As is noted above, a queue is used to cache received packets. The queue has two states: blocked and unblocked. In the blocked state, a packet is being sent out and all arriving packets must wait in the queue. In the unblocked state, the link is idle and a packet may be transmitted. The initial state of the queue is unblocked. The virtual time is initialized when the first packet arrives and is updated when every timer is scheduled. When a packet waiting in the queue is scheduled to be sent out, its timer expiration time is calculated based on the virtual time, which records when the last packet was sent out.

Figure 3:
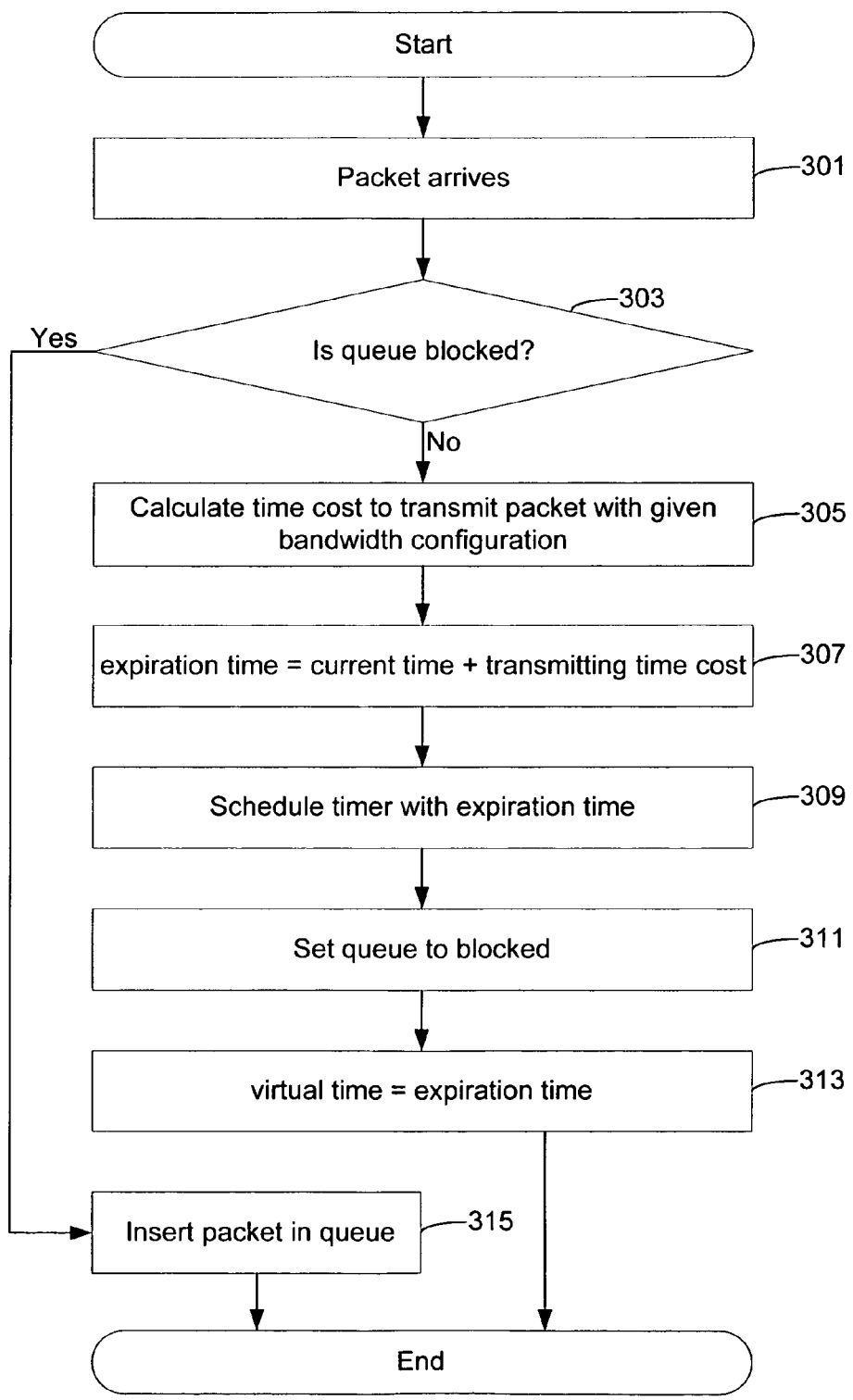
FIG. 3 is a flow diagram illustrating a first aspect of a bandwidth emulation process in accordance with the invention.

The bandwidth emulation algorithm embodied in the present invention includes two aspects. A first aspect comprises receiving a packet and scheduling a timer for it, as illustrated in the flow diagram of FIG. 3. After a start block, a packet arrives at block 301. At decision block 303, the state of the queue (blocked or unblocked) is determined. If the queue is blocked, the process flows to block 315 and the received packet is placed in the queue, following which the process flows to an end block. If the queue is unblocked, at block 305 the time cost for transmitting the packet in accordance with the given bandwidth configuration is calculated. At block 307 the expiration time is calculated, based on the current time and the transmitting time cost. In an embodiment, the expiration time is calculated as the sum of the current time and the transmitting time cost. At block 309 a timer is scheduled using the calculated expiration time. At block 311 the queue is set to the blocked state. At block 313 the expiration time is recorded as the updated virtual time, after which the process flows to an end block.

Figure 4:
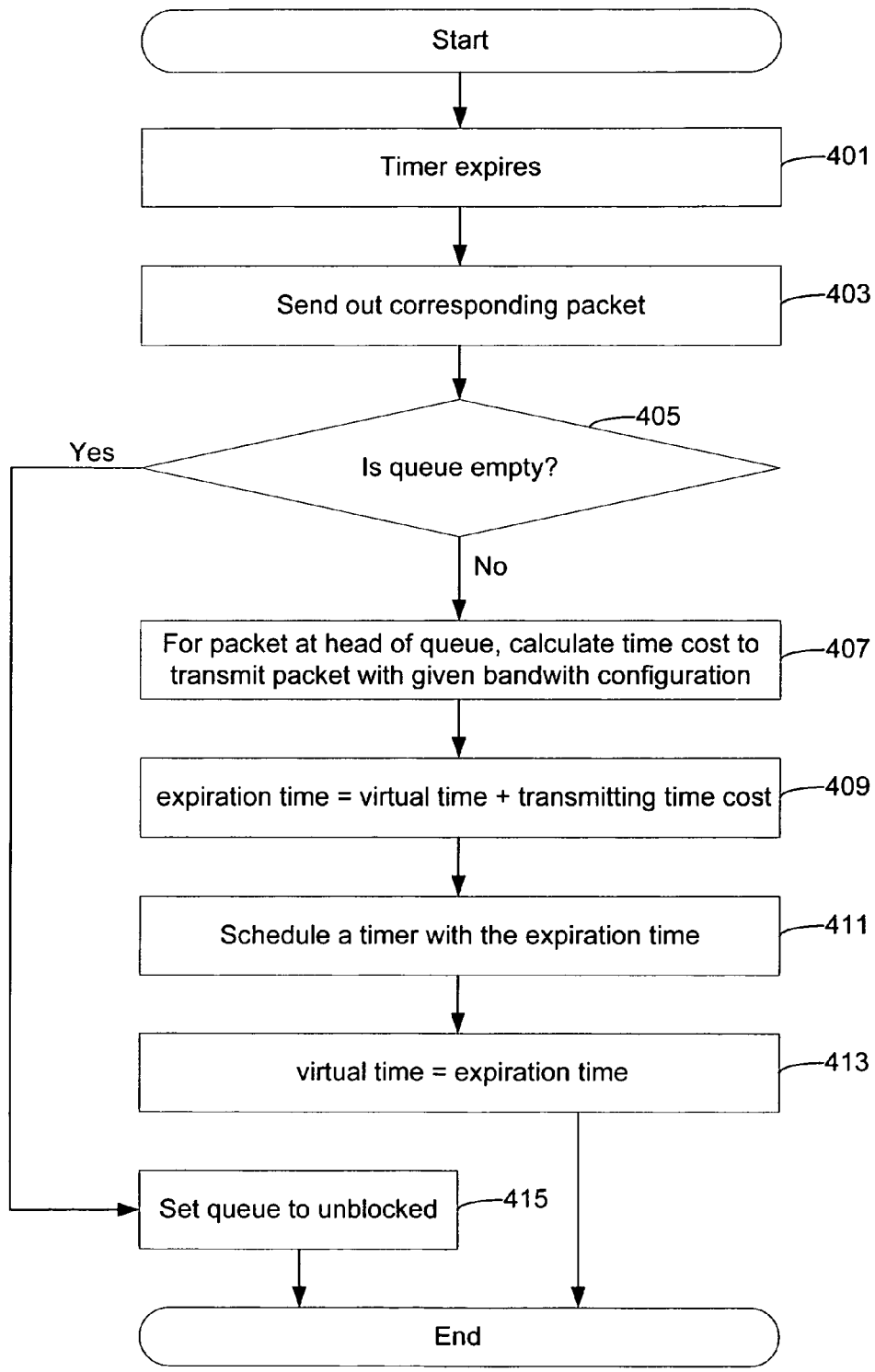
FIG. 4 is a flow diagram illustrating a second aspect of a bandwidth emulation process in accordance with the invention.

A second component of the bandwidth emulation algorithm relates to timer expirations, as illustrated in the flow diagram of FIG. 4. After a start block, a timer expires at block 401. At block 403 the packet to which the timer belongs is sent out. If the queue is empty, determined at decision block 405, the process flows to block 415, and the queue is set to the unblocked state. If the queue is not empty, at block 407, for the packet at the head of the queue, the time cost to transmit the packet with the given bandwidth configuration is calculated. As noted above, drop modes other than drop head mode may be used. At block 409 the expiration time is calculated based on the virtual time and the transmitting time cost. In an embodiment, the expiration time is the sum of the virtual time and the transmitting time cost. At block 411 a timer is scheduled with the expiration time. At block 413 the expiration time is recorded as the updated virtual time, after which the process flows to an end block.

Preferred embodiments of the present invention are described herein, including the best mode known to the inventors for carrying out the invention. In view of the many possible embodiments to which the principles of this invention may be applied, it should be recognized that the embodiments described herein are meant to be illustrative only and should not be understood to limit the scope of the invention. Those having skill in the art will recognize that the described embodiments can be modified in arrangement and detail without departing from the spirit of the invention. Therefore, the invention as described herein contemplates all such embodiments as may come within the scope of the following claims and equivalents thereof.

What is claimed is:

1. A method for emulating a network bandwidth condition, the method comprising:

maintaining a queue for holding received packets; wherein maintaining the queue further comprises maintaining the queue in one of a blocked state and an unblocked state; if the queue is in the unblocked state, calculating a time cost for transmitting a new packet in accordance with a specified bandwidth configuration; calculating a timer expiration time for the new packet based on a current time and the transmitting time cost; scheduling the packet timer based on the new packet timer expiration time; setting the queue to be in the blocked state; and recording the new packet timer expiration time as the virtual time;

maintaining a virtual time that is updated when a packet timer is scheduled; and calculating a queued packet timer expiration time that is based on the virtual time.

2. The method of claim 1, wherein maintaining the virtual time further comprises initializing the virtual time when an initial packet is received.

3. The method of claim 1, wherein calculating the new packet timer expiration time further comprises calculating the new packet timer expiration time as a sum of the current time and the transmitting time cost.

4. The method of claim 1, further comprising, when the packet timer expires:

sending a packet associated with the timer;

if the queue is not empty, for a packet in the queue:

calculating a time cost for transmitting the queued packet in accordance with a specified bandwidth configuration;

scheduling a timer for the queued packet based on the queued packet timer expiration time; and recording the queued packet timer expiration time as the virtual time.

5. The method of claim 1, wherein maintaining the queue further comprises maintaining the queue as a random earlier drop queue having a minimum queue size and a maximum queue size.

6. A system for emulating a network bandwidth condition, the system comprising:

a first computer having a network interface;

an emulator link for receiving and sending packets, the emulator link comprising a virtual network link to which the first computer is connected; and a bandwidth emulation module controlled by the emulator link, wherein the bandwidth emulation module maintains a queue for holding received packets that maintains the queue in one of a blocked stat and an unblocked state and when the queue is in the unblocked state: calculating a time cost for transmitting a new packet in accordance with a specified bandwidth configuration; calculating a timer expiration time for the new packet based on a current time and the transmitting time cost; scheduling the packet timer based on the new packet timer expiration time; setting the queue to be in the blocked state; and recording the new packet timer expiration time as the virtual time; wherein the bandwidth emulation module maintains a virtual time that is updated when a packet timer is scheduled, and wherein the bandwidth emulation module calculates a queued packet timer expiration time that is based on the virtual time.

7. The system of claim 6, wherein the queue further comprises a FIFO queue having a specified maximum size.

8. The system of claim 6, wherein the queue further comprises a random earlier drop queue having a minimum queue size and a maximum queue size.

9. The system of claim 6, wherein the queue has one of a drop head mode, a drop tail mode, and a drop random mode for dropping a packet when the queue is congested.

10. A computer-readable medium having computer-executable instructions for emulating a network bandwidth condition, the instructions comprising:

maintaining a queue for holding received packets; wherein maintaining the queue further comprises maintaining the queue in one of a blocked state and an unblocked state;

maintaining a virtual time that is updated when a packet timer is scheduled; and calculating a queued packet timer expiration time that is based on the virtual time;

and when the packet timer expires: sending a packet associated with the timer; if the queue is not empty, for a packet in the queue: calculating a time cost for transmitting the queued packet in accordance with a specified bandwidth configuration; scheduling a timer for the queued packet based on the queued packet timer expiration time; and recording the queued packet timer expiration time as the virtual time.

11. The computer-readable medium of claim 10, the instructions further comprising, when a new packet is received:

if the queue is in the unblocked state, calculating a time cost for transmitting the new packet in accordance with a specified bandwidth configuration;

calculating a timer expiration time for the new packet based on a current time and the transmitting time cost;

scheduling the packet timer based on the new packet timer expiration time;

setting the queue to be in the blocked state; and recording the new packet timer expiration time as the virtual time.

12. The computer-readable medium of claim 11, wherein calculating the new packet timer expiration time further comprises calculating the new packet timer expiration time as a sum of the current time and the transmitting time cost.

13. The computer-readable medium of claim 10, wherein maintaining the queue further comprises maintaining the queue as a FIFO queue having a specified maximum size.

14. The computer-readable medium of claim 10, wherein maintaining the queue further comprises maintaining the queue as a random earlier drop queue having a minimum queue size and a maximum queue size.

15. The computer-readable medium of claim 10, wherein maintaining the queue further comprises maintaining the queue in accordance with one of a drop head mode, a drop tail mode, and a drop random mode.

* * * * *